United States Patent [19]

Foster et al.

[11] Patent Number: 5,679,221

[45] Date of Patent: Oct. 21, 1997

[54] METHOD FOR ALUMINUM REDUCTION IN RECYCLED PULP AND PAPER

[75] Inventors: James Joseph Foster, Clifton Forge; Leo Thomas Mulcahy, Covington, both of Va.

[73] Assignee: Westvaco Corporation, New York, N.Y.

[21] Appl. No.: 541,104

[22] Filed: Oct. 11, 1995

Related U.S. Application Data

[63] Continuation-in-part of Ser. No. 296,432, Aug. 26, 1994, abandoned.

[51] Int. Cl.$^6$ ................................................. D21F 1/66
[52] U.S. Cl. ................................................. 162/190; 162/4
[58] Field of Search ................................ 162/190, 4, 55, 162/189, 5, 380

[56] References Cited

U.S. PATENT DOCUMENTS

| | | |
|---|---|---|
| 2,729,334 | 1/1956 | Schwarz et al. . |
| 3,354,028 | 11/1967 | Illingworth et al. . |
| 3,509,021 | 4/1970 | Woodward . |
| 3,637,491 | 1/1972 | Hedrick et al. . |
| 3,707,465 | 12/1972 | Reinwald et al. . |
| 3,769,116 | 10/1973 | Champeau . |
| 3,912,706 | 10/1975 | Rachor et al. . |
| 4,334,984 | 6/1982 | Vagac et al. . |
| 4,737,238 | 4/1988 | de Ruvo . |
| 4,750,992 | 6/1988 | Romine . |
| 4,921,613 | 5/1990 | Nordberg et al. . |
| 4,998,624 | 3/1991 | Capes et al. . |
| 5,008,089 | 4/1991 | Moody et al. . |
| 5,051,199 | 9/1991 | Barwise . |
| 5,112,782 | 5/1992 | Brown et al. . |
| 5,176,793 | 1/1993 | Kurtz . |
| 5,238,579 | 8/1993 | Shibley . |

*Primary Examiner*—Brenda A. Lamb
*Attorney, Agent, or Firm*—J. R. McDaniel; R. L. Schmalz

[57] ABSTRACT

This invention relates to recently developed systems which produced bleached recycled fibers from high lignin content recovered paper materials such as old corrugated containers and old newspapers. Such systems of this type, generally, use chemical digestion (e.g., the kraft process) to reduce the lignin content prior to bleaching. Since recovered paper materials normally have high levels of aluminum, which are derived from the paper sizing and pH control chemical, aluminum sulfate; and since soluble aluminum causes scaling of evaporators in the kraft digestion-chemical recovery cycle, there is a need for a means to remove soluble aluminum from the recovered paper materials prior to digestion.

11 Claims, 1 Drawing Sheet

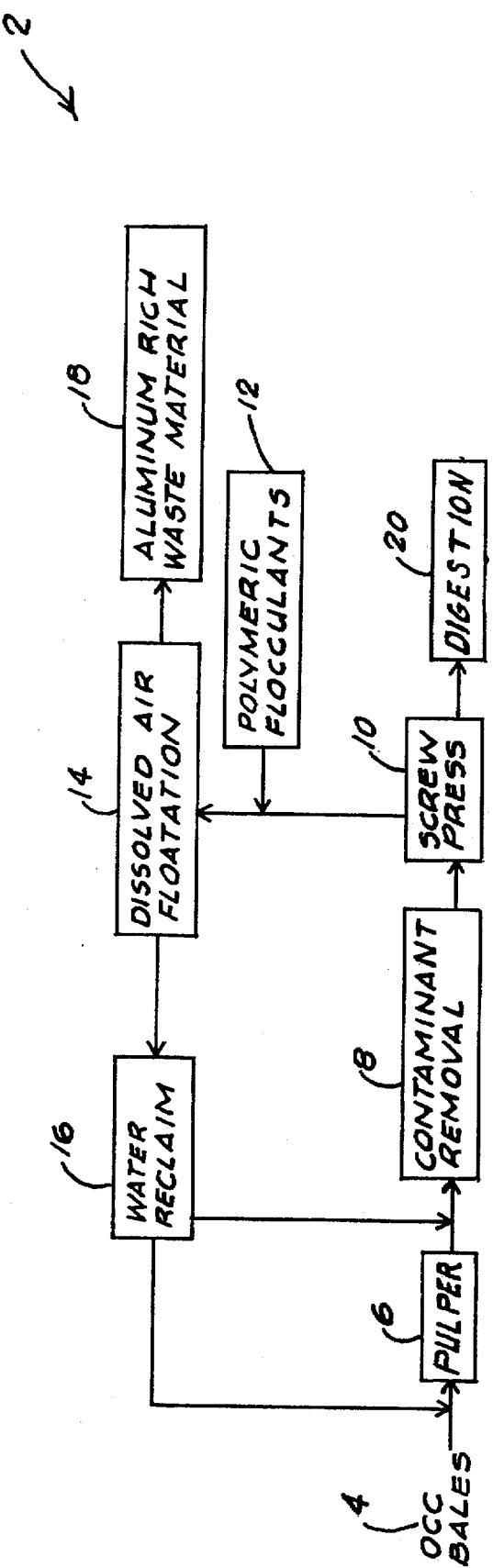
FIGURE

METHOD FOR ALUMINUM REDUCTION IN RECYCLED PULP AND PAPER

CROSS-REFERENCE TO RELATED APPLICATIONS

This application is a continuation-in-part of the commonly assigned, co-pending U.S. patent application Ser. No. 08/296,432, filed Aug. 26, 1994, entitled METHOD FOR ALUMINUM REDUCTION IN RECYCLED PULP AND PAPER, now abandoned.

BACKGROUND OF THE INVENTION

1. Field of the Invention

With the increased emphasis on recycling, new areas for recycled content paper have arisen in the high quality portion of the market. These markets, which include food packaging, require the development of novel technologies for processing the recycled fiber. These novel processing technologies show advantages to introducing the recovered paper at an earlier stage in the process then had conventionally been practiced.

This invention relates to recently developed systems which produced bleached recycled fibers from high lignin content recovered paper materials such as old corrugated containers and old newspapers. Such systems of this type, generally, use chemical digestion (e.g., the kraft process) to reduce the lignin content prior to bleaching. Since recovered paper materials normally have high levels of aluminum, which are derived from the paper sizing and pH control chemical, aluminum sulfate; and since soluble aluminum causes scaling of evaporators in the kraft digestion-chemical recovery cycle, there is a need for a means to remove soluble aluminum from the recovered paper materials prior to digestion.

2. Description of the Related Art

An example of an early introduction into the process is the production of bleached paper grades from unbleached waste paper. Benefits to using unbleached fiber or high lignin waste paper introduced prior to the pulping and bleaching include:

cheaper fiber can be used to produce a high quality product; and vigorous processing (pH, temperature, etc.) associated with upstream introduction purify the product, enabling its use in food contact application.

However, there is one significant downside to the introduction of waste paper into the pulping cycle where normally virgin wood chips are introduced. That is, the potential to introduce soluble aluminum contaminants into the pulping cycle liquors. Aluminum, in the form of alum (aluminum sulfate) is a common paper machine additive. Waste paper routinely contains high levels of aluminum.

Alum is added during the papermaking process to control pH and sizing efficiency. However, not all of the alum added in the process is retained with the fiber. The excess alum is washed away with the process water. The water used in the papermaking process can be reused in the papermaking process or the bleaching process. However, it should not be used in the brown stock washing or the pulping process because of the high levels of soluble aluminum. Aluminum is considered a serious contaminant if it finds its way into the chemical pulping recovery cycle.

The first stage of the recovery process requires the concentration of spent liquor from 14 to 18% solids to about 60% solids. This is typically performed with a multiple-effect evaporator. The heat transfer in the evaporators is affected by many factors, however, the main cause for losing heat transfer efficiency is scaling. Aluminum can react with silica present in spent liquor to form aluminum silicate.

To remove this scale, one has to use acid cleaning, thermal shock and/or mechanical treatment. Because of the extreme and expensive cleaning procedures needed to remove this scale, it is prudent to avoid introducing soluble aluminum into the chemical pulping recovery cycle. This is the reason that papermaking process water should not be reused in the pulping or brown stock washing steps. Adding waste paper earlier in the process would have a similar effect on the heat transfer in the evaporators. One method using waste paper as a raw material, but still limiting the amount of soluble aluminum entering the recovery cycle, is by segregating the water used in waste paper rehydration and cleaning. Exemplary of such prior art is set forth in U.S. Pat. No. 4,737,238 to A. R. de Ruvo, entitled "Method of Processing Waste Paper with White Water and Aluminum Recycle to Papermill."

In de Ruvo's method, soluble aluminum is washed out of the waste paper to form a dilute aluminum solution and pulp. The pulp is suitable for further processing into higher grades of paper, however the dilute soluble aluminum solution must be sewered or diverted to a use point down stream of the brown stock washers (i.e., downstream of chemical recovery and evaporation). In summary, de Ruvo's method can result in a high consumption of make-up water upstream of the point where water is sewered or diverted. Since paper mills continually strive to reduce water consumption, this is an undesirable outcome.

The method advanced by the present invention provides a means for removing the concentrated soluble aluminum bearing stream from the system and purifying the water so that it can be reused within the pulping process.

SUMMARY OF THE INVENTION

Generally speaking, this invention fulfills these needs by providing a soluble aluminum reduction method for pulp and paper recycling, wherein the method is comprised of the steps of: pulping a recyclable paper material; removing physical contaminants from the pulped material; pressing the pulped material to produce a first fluid containing a soluble aluminum-based substance; adding a polymeric flocculent to the first fluid to produce a second fluid; transporting the second fluid to a clarification means; removing substantially all of the soluble aluminum-based substance from the second fluid in the clarification means to produce a third fluid; disposing of the removed aluminum-based substance; transporting the third fluid to a fluid reclamation means to produce a reclaimed fluid; and adding, if necessary, the reclaimed fluid to the pulped material.

In certain preferred embodiments, the polymeric flocculent is a cationic polyacrylamide in a water-in-oil emulsion. Also, the clarification means is a dissolved air flotation cell and settling basin.

In another further preferred embodiment, the use of the polymeric flocculent/retention aid in the process water clarification unit reduces the soluble aluminum concentration of the processed water. This results in a reduction in the soluble aluminum concentration of the pulp.

The preferred system, according to this invention, offers the following advantages: ease of soluble aluminum reduction; excellent soluble aluminum reduction characteristics; good stability; good durability and excellent economy. In fact, in many of the preferred embodiments, these factors of ease of soluble aluminum reduction, excellent soluble aluminum reduction characteristics and excellent economy are optimized to an extent that is considerably higher than heretofore achieved in prior, known soluble aluminum reduction methods.

BRIEF DESCRIPTION OF THE DRAWING

The above and other features of the present invention, which will become more apparent as the description proceeds, are best understood by the considering the following detailed description in conjunction with the accompanying FIGURE, in which the FIGURE is a schematic illustration of a soluble aluminum reduction method for recycled pulp and paper, according to the present invention.

DETAILED DESCRIPTION OF THE INVENTION

Fiber sources suitable for recycling, pursuant to the present invention, may include corrugated box plant clippings characterized as double liner kraft (DLK) and post-consumer packaging such as old corrugated containers (OCC), kraft bagging, old newspapers (ONP), old newsprint and telephone directories. Although the industry makes generic distinctions between paper and paperboard, such distinctions are generally based on sheet thickness or caliper. Such art distinctions between paper and paperboard are of little or no significance to this invention, and consequently, the singular term "paper" will hereafter be used to describe both paper and paperboard.

Common to all of these paper sources is the presence of a high lignin content, the fibers having been either not cooked at all or only partially delignified by cooking. On the average, such paper sources are the products of 65 to 100% yield pulp. Typically, less than one-half of the native lignin has been removed.

As a post-consumer product, high lignin kraft paper has been combined with plastic film, a myriad of adhesive compositions, metal fasteners, binding wire, and countless other physical, chemical, and biological contaminants including those known in the art as "stickies," contaminants such as hot melts and pressure sensitive adhesives, styrofoam, lattices, waxes and similar materials that have a tendency to adhere to or deposit on paper machine equipment such as forming fabrics, press felts, dryer felts, dryer cans, and coater blades.

As a first step towards separating natural fiber from the contaminants, the recycled material is slurried with quantities of aqueous fluids.

The descriptive phrase "aqueous fluids" is intended to encompass all suitable water mixtures and solutions such as paper machine white water and brown stock wash water. Of course, clean water may also be used, and these fluids will be described simply as "water."

As shown in the FIGURE, system 2 illustrates that recyclable material is received by a paper mill in dry, compacted bales 4. The recycled paper bales 4 and water are combined in a conventional pulper vessel 6. The combined action of water saturation and mechanical stirring frees the fiber from such gross physical contaminants as binding wire, metal fasteners, tape and some plastics. This repulping is normally a continuous process, however it may also be a semi-continuous or a batch process.

When the fibers of the waste paper are sufficiently disassociated, the stock is further diluted with an aqueous fluid to 3 to 5%, by weight consistency, by means of water reclamation unit 16. It is to be understood that water reclamation unit 16 may add water to bales 4 before bales 4 are introduced into vessel 6.

The pulp then passes to conventional contaminant removal device 8. Contaminant removal device 8 consists of a series of devices designed to remove any physical contaminants. This contaminant removal is carried out by, but not limited to, a conventional cleaners, conventional screens, conventional detrashers, conventional sand cleaners, conventional screen cleaners, centrifugal cleaners and thickeners.

Once the contaminants are removed, the pulp is then transported to a conventional screw press 10 or other device which increases the solids in the pulp to about 30 to 60%. In this state, the stock is a wet, friable pulp, with a water content close to that of fresh wood chips.

After the pulp is subjected to screw press 10, the processed water that is removed by screw press 10 is transported to a clarification device 14. Clarification device 14, preferably, is a dissolved air flotation cell and/or gravity settling basin.

Also, before the process water is transported into clarification device 14, a polymeric flocculent is added to the process water. Preferably, the polymeric flocculent is a cationic polyacrylamide in a water-in-oil emulsion, such as Magnifloc® 1590C, produced by the American Cyanamid Company of Wayne, N.J.

Once the process water and the polymeric flocculent are added to the clarification device 14, substantially all soluble aluminum originally contained in the process water is removed. The soluble aluminum is removed through use of the flocculents and the dissolved air flotation cell and/or gravity settling basin. The removed aluminum is then transported to a conventional aluminum disposal means 18 where the aluminum is conventionally disposed.

The remaining liquids, in which substantially all of the soluble aluminum has been removed by clarification device 14, is transported to a conventional water reclamation device 16. The liquid is then transported back to the pulp, if necessary, as previously described.

After the process water has been removed in the screw press 10, the wet, recycled pulp is then charged into conventional digestion equipment 20 known in the industry.

Once given the above disclosure, many features, modifications or improvements will become apparent to the skilled artisan. Such features, modifications or improvements are, therefore, considered to be a part of this invention, the scope of which to be determined by the following claims.

What is claimed is:

1. A soluble aluminum reduction method for recycled pulp and paper, wherein said method is comprised of the steps of:

pulping a recyclable paper material;

removing physical contaminants from said pulped material;

pressing said pulped material to produce a first fluid containing a soluble aluminum-based substance;

adding a polymeric flocculent to said first fluid to agglomerate said soluble aluminum-based substance to produce floc particles suspended in a second fluid, wherein said polymeric flocculent is further comprised of: a cationic polyacrylamide in a water-in-oil emulsion;

transporting said second fluid containing said agglomerated aluminum-based substance to a clarification means;

removing substantially all of said agglomerated aluminum-based substance from said second fluid in said clarification means to produce a third fluid;

disposing of said removed agglomerated aluminum-based substance;

transporting said third fluid to a fluid reclamation means to produce a reclaimed fluid; and adding, if necessary, said reclaimed fluid to said pulped material.

2. The method, as in claim 1, wherein said recyclable paper material is further comprised of:

corrugated paperboard containers.

3. The method, as in claim 1, wherein said recyclable paper material is further comprised of:

double liner kraft.

4. The method, as in claim 1, wherein said recyclable paper material is further comprised of:

kraft bagging.

5. The method, as in claim 1, wherein said recyclable paper material is further comprised of:

old newspapers.

6. The method, as in claim 1, wherein said recyclable paper material is further comprised of:

old newsprint.

7. The method, as in claim 1, wherein said recyclable paper material is further comprised of:

telephone directories.

8. The method, as in claim 1, wherein said contaminant removal step is further comprised of:

a cleaner means;

a screen means; and a thickener means.

9. The method, as in claim 1, wherein said pressing step is further comprised of:

a screw press.

10. The method, as in claim 1, wherein said clarification means is further comprised of:

a dissolved air flotation cell.

11. The method, as in claim 1, wherein said clarification means is further comprised of:

a gravity settling basin.

* * * * *